(12) United States Patent
Schiegg et al.

(10) Patent No.: US 12,333,390 B2
(45) Date of Patent: Jun. 17, 2025

(54) COMPUTER IMPLEMENTED MACHINE LEARNING SYSTEM AND A METHOD FOR OPERATING THE MACHINE LEARNING SYSTEM FOR DETERMINING A TIME SERIES

(71) Applicant: Robert Bosch GmbH, Stuttgart (DE)

(72) Inventors: Martin Schiegg, Korntal-Muenchingen (DE); Muhammad Bilal Zafar, Berlin (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1160 days.

(21) Appl. No.: 17/138,685

(22) Filed: Dec. 30, 2020

(65) Prior Publication Data

US 2021/0241174 A1 Aug. 5, 2021

(30) Foreign Application Priority Data

Feb. 3, 2020 (EP) ..................................... 20155185

(51) Int. Cl.
*G06N 20/00* (2019.01)
*G06F 17/18* (2006.01)
*G06N 3/045* (2023.01)

(52) U.S. Cl.
CPC ............. *G06N 20/00* (2019.01); *G06F 17/18* (2013.01); *G06N 3/045* (2023.01)

(58) Field of Classification Search
None
See application file for complete search history.

(56) References Cited

U.S. PATENT DOCUMENTS

2019/0155672 A1\* 5/2019 Wang .................. H04L 63/1425

OTHER PUBLICATIONS

Anderson, et al.: "On-Demand Trajectory Predictions for Interaction Aware Highway Driving", arxiv.org, Cornell University Library, (2019), pp. 1-8, XP081611476.
Bae, et al.: "Cooperation-Aware Lane Change Control in Dense Traffic based on Model Predictive Control with Recurrent Neural Network", arxiv.org, Cornell University Library, (2019), pp. 1-8, XP081482241.

(Continued)

*Primary Examiner* — Vincent Gonzales
(74) *Attorney, Agent, or Firm* — NORTON ROSE FULBRIGHT US LLP

(57) ABSTRACT

A machine learning system and method of operating a machine learning system for determining a time series, comprising providing an input for a first in particular generative model depending on a probabilistic variable, determining an output of the first model in response to the input for the first model, the output of the first model characterizing the time series. The first model comprises a first layer that is trained to map input for the first model determined depending on the probabilistic variable to output characterizing intermediate data, and a second layer that is trained to map the intermediate data to the time series depending on an output of a third layer of the first model. The output of the third layer characterizes a physical constraint to a machine state. Values of the time series or of the intermediate data are constrained by the output of the third layer.

12 Claims, 3 Drawing Sheets

(56) References Cited

OTHER PUBLICATIONS

Ding, et al.: "A New Multi-Vehicle Trajectory Generator to Simulate Vehicle-to-Vehicle Encounters", arxiv.org, Cornell University Library, (2019), pp. 1-7, XP081191599.
Li, et al.: "Conditional Generative Neural System for Probabilistic Trajectory Prediction", arxiv.org, Cornell University Library, (2019), pp. 1-8, XP081272371.
Wang, et al.: "Adversarial Inverse Reinforcement Learning for Decision Making in Autonomous Driving", arxiv.org, Cornell University Library, (2019), pp. 1-7, XP081535194.

* cited by examiner

COMPUTER IMPLEMENTED MACHINE LEARNING SYSTEM AND A METHOD FOR OPERATING THE MACHINE LEARNING SYSTEM FOR DETERMINING A TIME SERIES

CROSS REFERENCE

The present application claims the benefit of European Patent Application No. EP 20155185.0 filed on Feb. 3, 2020, which is expressly incorporated herein by reference in its entirety.

BACKGROUND INFORMATION

Operating variables of machines may be determined from measurements by physical models or probabilistic models. While physical models are deterministic, the accuracy of the operating variable determined based on a physical model depends on the observability of the relevant information. Probabilistic models may model unobservable behavior. However, it is difficult to prove that the variable that is predicted by the probabilistic model is physically viable.

It is desirable to determine the operating variable reliably and accurately.

SUMMARY

The present invention provides a computer implemented method and a machine learning system.

In accordance with an example embodiment of the present invention, the computer implemented method of operating a machine learning system for determining a time series, comprises providing an input for a first in particular generative model depending on a probabilistic variable, in particular noise, determining an output of the first model in response to the input for the first model, wherein the output of the first model characterizes the time series, wherein the first model comprises a first layer that is trained to map input for the first model determined depending on the probabilistic variable to output characterizing intermediate data, wherein the first model comprises a second layer that is trained to map the intermediate data to the time series depending on an output of a third layer of the first model, wherein the output of the third layer characterizes a physical constraint to a machine state, and wherein values of the time series or of the intermediate data are constrained by the output of the third layer. The first model is a generative model for the time series. The third layer provides a physical constraint that is learned by the first model. Therefore, the accuracy and reliability of the prediction of the time series is significantly improved.

Preferably, the method comprises providing the input for the first in particular generative model depending on a conditional variable, in particular comprising of an environment variable, wherein the first layer and/or the second layer are trained to map input for the first model determined depending on the conditional variable and the probabilistic variable to output characterizing the intermediate data.

Preferably, the method comprises providing an input for the third layer depending on at least one state of a machine and/or the conditional variable, and determining an output of the third layer in response to the input for third layer. These inputs are particularly useful for determining the physical constraint accurately and reliably.

Preferably, the physical constraint for a time step is determined depending on the time series in a previous time step, a force applied in the environment and/or a force applied by or to the machine in the environment. This way, the physical model determines the constraints for the time series based on previous values of the time series and/or useful physical information from the environment.

Preferably, the conditional variable comprises at least one of: an environment variable or an internal machine state. Very generally, the optional environment variable or the internal machine state may be a sequence or a vector of inputs describing the state of the environment, of the machine in the environment or the internal machine state. This information may be used for predicting the time series by the generative model and for training of the generative model.

Preferably, the method comprises providing an input for a second model depending on the conditional variable and/or the time series, determining an output of the second model in response to the input for the second model, wherein the output of the second model characterizes a score indicating a degree of reliance for the time series, wherein the second model is trained to map input for the second model determined depending on the conditional variable and/or the time series to output of the second model characterizing the score indicating the degree of reliance for the time series. The scores provides additional information about the realness or fakeness of the time series with respect to a real world time series.

Preferably, the method comprises providing the conditional variable as a continuous or discrete first series of values over time within a time period, and/or providing the probabilistic variable as a continuous or discrete second series of values over time within the time period, determining by the first model, in particular a first Recurrent Neural network, a continuous or discrete third series of values for the time series depending on the values of the first series and/or the second series, and determining by the second model, in particular a second Recurrent Neural network, the score depending on the values of the first series and/or the third series. This means in case the conditional variable is used as input, the models process the same values of the common input and therefore the reliability of the score as indicator for the accuracy is improved.

Preferably, the time series characterizes a machine state series and the intermediate data characterizes a machine state change series. In particular, the machine state series may be a velocity series of a vehicle. The optional conditional variable may be a state of the vehicle and/or route information such as a geographical characteristic, in particular an absolute height or a road slope characteristic and a traffic flow characteristic, in particular a time dependent average speed of traffic, and a road characteristic, in particular a number of lanes, road type and/or road curvature, and a traffic control characteristic, in particular a speed limit characteristic a number of traffic lights, a number of traffic signs of a specific type, a number of stop signs, a number of yield signs and/or a number of pedestrian crossing signs, and a weather characteristic in particular an amount of rain at a predetermined time, a wind speed and/or a presence of fog. This way, velocity traces of high reliability and accuracy can be determined.

Preferably, the time series characterizes a position over time of the machine in the environment and the intermediate data characterizes a change of speed and/or angle over time of the machine in the environment. The machine may be a robot. The time series may be a position series of the robot.

The optional conditional variable may be a state of the robot. This way, robot trajectories of high reliability and accuracy can be determined.

Preferably, the machine state characterizes a velocity and the intermediate data characterizes an unconstrained acceleration or the machine state characterizes a gear of a transmission and the intermediate data characterizes an unconstrained gear.

Preferably, the time series is determined depending on output of the first model and the second model in response to training data defining input data for the first model and the second model, wherein the output of the second model characterizing the score indicating the degree of reliance for the time series is determined, and wherein at least one parameter of the first model and/or the second model is determined depending on the score. This provides an efficient training of the machine learning system.

Preferably, the method comprises providing input data comprising the time series and/or the conditional variable, the intermediate data and the at least one state of the machine.

In accordance with an example embodiment of the present invention, a machine learning system is provided comprising the first model and the second model and is adapted to perform the steps of the example method(s).

Further advantageous aspects of the present invention can be derived from the following description and the figures.

DETAILED DESCRIPTION OF EXAMPLE EMBODIMENTS

Figure 1:
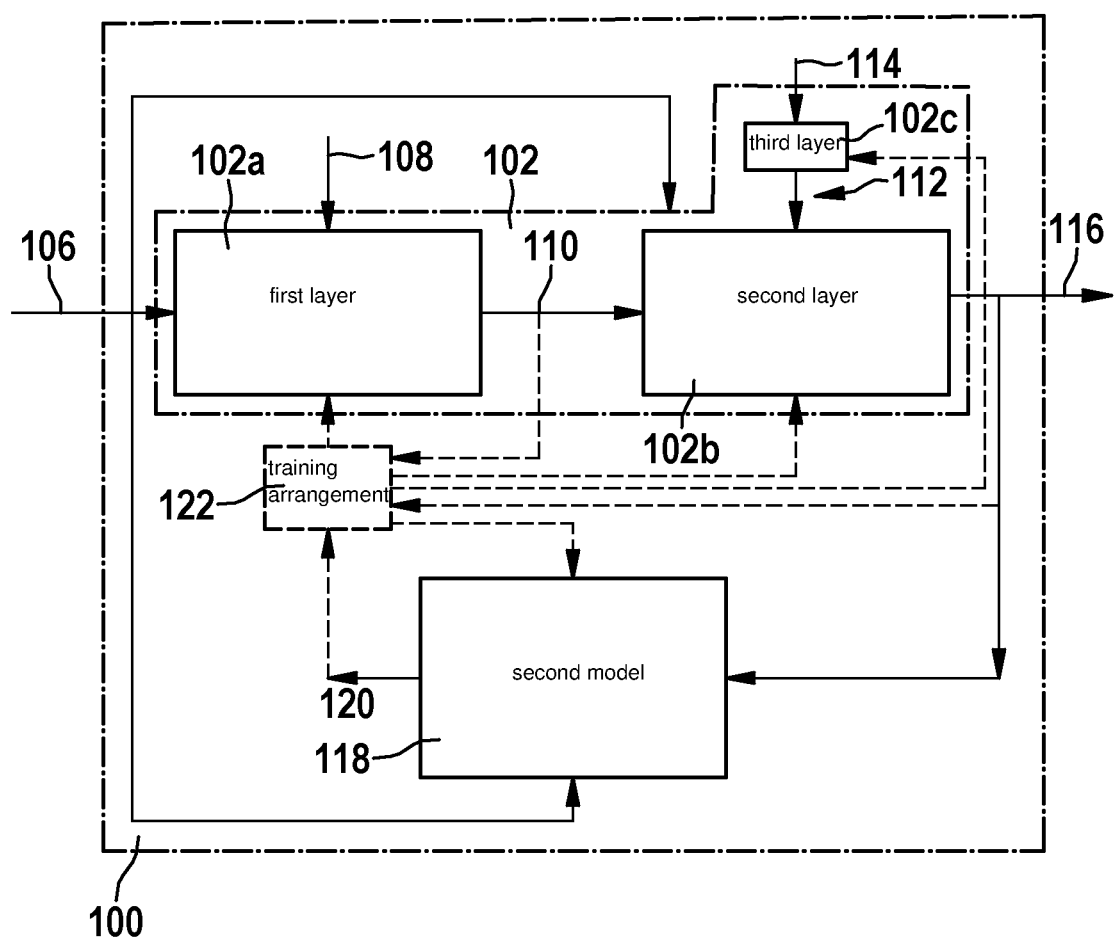
FIG. 1 schematically depicts a device for determining a time series, in accordance with an example embodiment of the present invention.

FIG. 1 schematically depicts a device 100. The device 100 may comprise at least one processor and storage that may be adapted for executing models and steps of a method that will be described below.

The device 100 comprises a first in particular generative model 102.

The first model 102 comprises a first layer 102a. The first layer 102a is a data-based model. The first model 102 comprises a second layer 102b. The first model 102 comprises a third layer 102c. The third layer 102c is a physical model.

The first layer 102a, the second layer 102b, and the third layer 102c in this context are model layers, i.e. components of the first model 102. The term layer in this context does not correspond to one layer in a neural network but one model layer may consist of multiple neural network layers.

The first layer 102a in the depicted example is adapted to map input characterizing a conditional variable 106 and a probabilistic variable 108, in particular noise, to output characterizing an intermediate data 110 for a machine. The conditional variable 106 is not necessary; it's optional to have conditional input in the first model 102. When the conditional variable 106 is used, it may in particular comprise of an environment variable. Using the conditional variable 106 as an input may result in higher accuracy.

The conditional variable 106 is an optional input sequence. If, for example, a gear of a transmission of the machine is generated by the generative first model 102, also velocity is an input in the conditional variable 106. In that case, the conditional variable 106 contains environmental information and velocity as the machine state. One can generate velocities on arbitrary routes the machine may take or independent of any route. The generative model, i.e. the first model 102, may only depend on a noise input sequence in the probabilistic variable 108, and does not necessarily depend on the environment.

The third layer 102c is adapted to determine output characterizing at least one physical constraint 112. The output of the third layer 102c may be determined depending on at least one state of the machine 114 and/or the conditional variable 106.

The first model 102 is a generative model for predicting machine output characterizing a time series 116. The third layer 102c is a physical model for physically modelling plausible machine outputs. The second layer 102b is adapted to apply the at least one physical constraint 112 to determine the time series 116 in order to limit values of the time series 116 to plausible values. For the machine a time-series of machine output is available that may depend on environment variables and/or some unobservable variables.

The device 100 is in this aspect adapted to convert the intermediate data 110 output of the first layer 102a of the first model 102 to the time series 116 depending on the at least one physical constraint 112. The third layer 102c enriches the purely data-based generator output of the first model 102 with prior knowledge from physics. This provides a "hybrid" model as it combines a data-based model with a physics-based model.

The device 100 may comprise a second model 118. The second model 118 may be a data-based model. The second model 118 is adapted to map input characterizing the time series 116 to output characterizing a score 120 indicating a degree of reliance for the time series 116. The score 120 may output a true or false information regarding whether the time series represented by the output matches a real world time series. When the conditional variable 106 is available, the second model 118 may be adapted to map input characterizing the time series 116 and the conditional variable 106 to output characterizing the score 120.

The device 100 may comprise a training arrangement 122 adapted to determine at least one parameter of the first model 102 depending on the score 120. In the example, for training the first model 102 a gradient descent method, e.g. ADAM, may be iteratively repeated based on training data for training the first model 102 to map input characterizing the conditional variable 106 and/or the probabilistic variable 108 to output the intermediate data 110. The second model 118 may be trained. Input data for the training may comprise the time series 116, the conditional variable 106, the intermediate data 110 and/or the at least one state of the machine 114. Training in this context refers to determining parameters for either the first model 102 or the second model 118 or alternatingly between the first model 102 and the second model 118 depending on the training data. Input data for one training cycle may comprise the time series 116, the conditional variable 106, the intermediate data 110 and the at least one state of the machine 114.

The device 100 in one example comprises a Generative Adversarial Network, wherein the first model 102 is configured as Generator and trained and the second model 118 is configured and trained to score the realness or fakeness of a given time series 116 as known for a Generative Adversarial Network. A Jenson-Shannon divergence, in particular a regularized Jenson-Shannon divergence, may be used as objective function for training the Generative Adversarial Network. In one example, the Generative Adversarial Network is a Wasserstein Generative Adversarial Network. This means the second model 118 is a critic or discriminator that scores the realness or fakeness of the time series 116 depending on the Wasserstein distance.

The Generative Adversarial Network is for example set up as follows:

The time series 116 are given as a multivariate time series $x_{1:T}$ of length T with $x_t \in \mathbb{R}^D$. The conditional variable 106 is given as conditions over time $c_{1:T}$ with $c_t \in \mathbb{R}^C$. The conditions may be defined by the environment in one example. The discriminator may or may not depend on the environment variable 106. The Generative Adversarial Network learns to draw samples x, c from a unknown distribution $P_{x,c}$ in particular to use a generator network g(z). The probabilistic variable 108 in the example is noise $z_t \in \mathbb{R}^Z$ drawn from a known distribution, i.e. $z_i \sim P_z$ to form a time series of noise $z_{1:T}$. The known distribution is for example a standard Normal or Uniform distribution. A time series of the intermediate data 110 is denoted as $\dot{x}_{1:T}$.

With this it is possible to generate a one dimensional output time series 116, e.g. D=1 or more outputs at the same time, e.g. two outputs with D=2. This is useful, if more than one machine output shall be generated with the same first model 102.

In one aspect some real data $r=(x,c) \sim P_{x,c}=P_r$ is given based on values x for the time series and conditions c. The Generative Adversarial Network learns to draw samples from a distribution $Q_{x|c}$. A generator network g(z) is trained to sample from the distribution $Q_{x|c}$ using another distribution $Q_r = Q_{x|c} P_c$ that approximates the real data distribution $P_r$. More specifically, the discrepancy div($P_r, Q_r$), in particular div($P_{x,c}, Q_{x,c}$), is minimized via adversarial training.

The conditions c, i.e. the conditional variable, is optional. When the conditional variable is not used, some real data variable $r=x \sim P_x$ may be used instead. Then the Generative Adversarial Network instead learns to draw samples from a distribution $Q_r$ directly.

The discrepancy in the example is the Wasserstein distance or the Jenson-Shannon divergence, in particular a regularized Jenson-Shannon divergence. Given the generator network g and a critic ƒ this corresponds to the following minimax objective:

$$\min_g \max_{f \in F} V(P_r, Q_r)$$

wherein the $\max_{f \in F} V(.)$ means estimating the divergence, which the generator tries to minimize. When the conditions c are used, the Wasserstein distance is defined for example as $$W(P_{x,c}, W_{x,c}) = \sup_{f \in F} E_{(x,c) \sim P_{x,c}}[f(x,c)] - E_{z \sim P_z, c \sim P_c}[f(g(z,c),c)]$$

where F consists of all 1-Lipschitz functions, i.e. F={ƒ: $\|f\|_L \le 1$}.

Hence the min max objective is $$\min_g \max_{f \in F} E_{(x,c) \sim P_{x,c}}[f(x,c)] - E_{z \sim P_z, c \sim P_c}[f(g(z,c),c]$$

When the conditions c are not used, the Wasserstein distance is:

$$W(P_x, Q_x) = \sup_{f \in F} E_{x \sim P_x}[f(x)] - E_{z \sim P_z}[f(g(z))]$$

Hence the min max objective is $$\min_g \max_{f \in F} E_{x \sim P_x}[f(x)] - E_{z \sim P_z}[f(g(z))]$$

In an example, a time series trace $x_{1:T}$ is generated depending on an intermediate data trace $\dot{x}_{1:T}$ that is generated by the first model 102. A value $x_{t+1}$ of the time series trace $x_{1:T}$ at a time step t+1 is then determined depending on a value $\dot{x}'_{t+1}$ of the intermediate data trace $\dot{x}_{1:T}$:

$$x_{t+1} = s(\dot{x}'_{1:t+1}, \Delta t, x_{1:t})$$

where $\Delta t$ is the time difference between the two consecutive time steps and s(•) is a function mapping the intermediate data trace, the time difference and the time series trace up to time step t to a value of the time series trace at time step t+1. In particular, the function s(•) can be given by:

$$s(\dot{x}'_{1:t+1}, \Delta t, x_{1:t}) = [\dot{x}'_{t+1} \times \Delta t] + x_t$$

The data-based first model 102 predicts time series at each time-step t. With a start value for the time series at the 0-th time step given, the intermediate data values are evaluated by the third layer 102c over successive time-steps successively to get the time series trace.

The start value is for example determined according to one of the three following possibilities:

It may be assumed that the start value is zero.

An additional start-value-model, e.g., an artificial neural network, may be trained on start values a priori, e.g., with the same input the generative model gets. This additional start-value-model may be used in the generator for determining the start value.

In addition to this, the additional start-value-model may be trained within the training scheme of the Generative Adversarial Network by adjusting the parameters of the start-value-model in order to fool a discriminator of the Generative Adversarial Network.

Both the intermediate data value or the computed time series value may be used from the time-step t in the first model 102 to predict an intermediate data value for time-step t+1. This means the intermediate data 110 in one time step may be determined from the time series 116 of a previous time step.

If the function s(•) is defined as above, then the intermediate data follows a much smaller range than the values of the time series and are centered around 0. This makes it easier for a neural network used as first model 102 to learn it due to low variance in magnitude, thus resulting in faster and more stable training.

Additionally, the third layer 102c may determine at least one physical constraint 112 on the intermediate data 110 depending on at least one state of the machine 114. The time series 116 is determined in this aspect depending on the at least one physical constraint 112 on the intermediate data 110.

The third layer 102c is described in further detail below.

In one aspect, the intermediate data 110 to be generated is constrained depending on the at least one state of the machine 114 to values only within physically plausible ranges.

In an example, physical forces that can be applied in the environment are computed, e.g. a force applied by the machine. In another example, forces that the machine faces in the environment, i.e. forces that are applied to the machine, are computed. This and other relevant relations are conventional in physics/engineering literature.

In an example the machine has the time-series output which may depend on environment variables and/or some unobservable variables. The third layer 102c is a physical model that can model limits to some machine state. The first layer 102a is a data-based model that generates an intermediate unconstrained machine state in particular as output, then the physical limits are provided by the third layer 102c, and then the second layer 102b generates the constrained machine output as output of the first model 102.

In one example, the machine is a vehicle and the machine state is a velocity v of the vehicle. In this case, for example the following physical model is used:

The force applied by air drag $F_{air}$ to the vehicle depends on: vehicle shape (in particular the vehicle front surface area A, air density $\rho_{air}$, air drag coefficient $c_w$, and the current velocity v.

A roll drag force $F_{roll}$ depends on: vehicle mass $m_{vehicle}$, constant of gravitation g, rolling resistance coefficient $f_{roll}$ (which depends on the friction between the vehicle tires and the road surface), and the road slope $\alpha$.

A slope drag force $F_{slope}$ depends on: vehicle mass $m_{vehicle}$, constant of gravitation g, road slope $\alpha$.

A maximum brake force $F_{brake\ max}$ depends on: brake power $p_{brake}$ and velocity v.

A brake friction force $F_{fr\ brake}$ depends on: vehicle mass $m_{vehicle}$, constant of gravitation g, friction coefficient $\mu_k$, slope $\alpha$.

A drive engine force $F_{drive\ engine}$ depends on: maximum engine power $p_{max}$, vehicle velocity v, tension factor $r_e$. The tension factor itself depends on the current velocity and some constants.

A drive friction force $F_{fr\ drive}$ depends on: vehicle mass $m_{vehicle}$, number of driving axles $n_{drive\ axles}$, total number of axles $n_{axles}$, constant of gravitation g, friction coefficient $\mu_k$, slope $\alpha$.

The variables mentioned above are for example either measured, given by a vehicle specification or a route specification or a combination thereof. The vehicle specification comprises for example the vehicle mass $m_{vehicle}$ and the front surface area A. The route specification comprises for example the slope $\alpha$. The combination of both vehicle and route specification comprises for example friction coefficients that depend on tires, road surface type and basic physics, e.g. the gravitation constant. It is also possible to estimate vehicle specific parameters from data of other in particular similar vehicles if the exact specification is unknown.

By way of example, the time series 116 characterizes a velocity of the vehicle and the intermediate data 110 characterizes an acceleration of the vehicle.

A physically plausible range of acceleration $[\underline{a}_{t+1}, \bar{a}_{t+1}]$ that is possible at time step t+1 may in this case be computed. The physically plausible range of acceleration $[\underline{a}_{t+1}, \bar{a}_{t+1}]$ in an example is computed given the forces described above that partly depend on the velocity, i.e. the value of time series 116 at time step t.

The acceleration $\dot{x}_{t+1}$ at a time step t+1 hence is limited by the second model 104 to $$\underline{a}_{t+1} \leq \dot{x}_{t+1} \leq \bar{a}_{t+1}$$

where $\underline{a}_{t+1} = c_{min}(x_{1:t}, c_{1:t})$ and $\bar{a}_{t+1} = c_{max}(x_{1:t}, c_{1:t})$.

The values of $c_{min}(\cdot)$ and $c_{max}(\cdot)$ are determined by the second model 104 as a minimum acceleration and a maximum acceleration for a given vehicle and its parameters. In an example for $v_{max}$=100 km/h this results in:

$$m_{vehicle} c_{min} = \min(F_{drive\ engine}, F_{fr\ drive}) - F_{air} - F_{roll} - F_{slope}$$

$$m_{vehicle} c_{max} = -\min(F_{brake\ max}, F_{fr\ brake}) - F_{air} - F_{roll} - F_{slope}$$

where $$F_{air} = \frac{\rho_{air}}{2} c_w A v^2$$

$$F_{roll} = m_{vehicle}\, g\, f_{roll} \cos(\alpha)$$

$$F_{slope} = m_{vehicle}\, g\, \sin(\alpha)$$

$$F_{brake\ max} = \frac{P_{brake}}{v}$$

$$F_{fr\ brake} = m_{vehicle}\, g\, \mu_k \cos(\alpha)$$

$$F_{drive\ engine} = \frac{P_{max}}{v r_c}$$

$$F_{fr\ drive} = m_{vehicle}\, g\, \frac{n_{drive\ axles}}{n_{axles}} g\, \mu_k \cos(\alpha)$$

$$r_c = 1 + \frac{\lambda_{max} - 1}{10^{\frac{v}{v_{max}}}}$$

$$\lambda_{max} = 1.2$$

$$v_{max} = 100 \text{ km/h}$$

Figure 2:
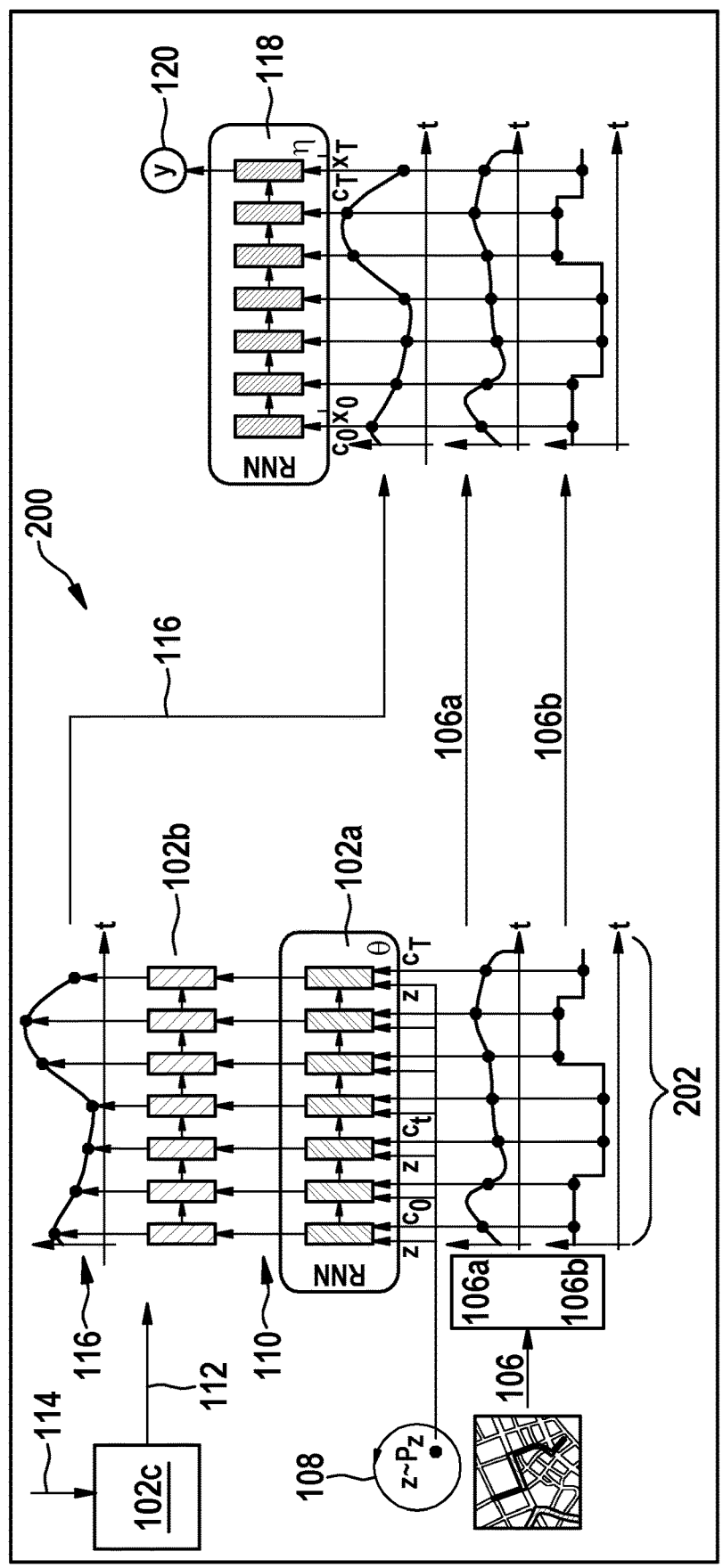
FIG. 2 schematically depicts a machine learning system, in accordance with an example embodiment of the present invention.

In FIG. 2, an exemplary machine learning system 200 for determining the machine output as time series 116 is depicted schematically.

In the example, the conditional variable 106 is defined by a continuous series of values over time within a time period 202. Instead of continuous series of values over time within the time period 202, the series of values may be discrete.

The first model 102 comprises at least one Recurrent Neural network. The Recurrent Neural network may be implemented as a Long Short Term Memory network, a Gated recurrent unit, a Transformer architecture, or a vanilla Recurrent Neural network. The first model 102 is adapted to process values of the series of values of the time period 202. The values of the probabilistic variable 108 are determined in the example as noise $z \sim P_z$ sampled from an in particular Standard normal or uniform distribution $P_z$. Any other distribution may be used as well. The input to the first layer 102a is the noise z and an input $c_i$ for i=0, . . . , T wherein T is a number of discrete values in the time period 202 that is determined depending on the conditional variable 106. In this aspect, the noise z and the conditional input $c_i$ may be concatenated to form the input for the first layer 102a. The output of the first layer 102a in response to this input is the intermediate data 110. The second layer 102b is adapted to process the intermediate data 110 depending on the output of the third layer 102c. In the example the at least one physical constraint 112 is provided as the output the third layer 102c.

The second model 118 is adapted to process as input for the second model 118 values of the series of values of the time period. The input to the second model 118 is the input $c_i$ that is determined depending on the conditional variable 106 and the time series 116 indicated as $x_i$. In this aspect, the input $c_i$ and $x_i$ may be concatenated to form the input for the second model 118. If the conditional variable 106 is not available, then the input is only $x_i$. This second model 118 outputs the score 120 indicating for example by y=1 the realness and by y=0 the fakeness of the time series 116 in response to the input for the second model 118. The score is not necessarily binary. The score may be a continuous value, for instance positive for true, negative for false. In the Wasserstein Generative Adversarial Network mentioned above, y is a continuous value.

The machine learning system 200 in the example is adapted to process the same value of the conditional variable 106 in the series of values of the time period in the same cycle by both, the first model 102 and the second model 118.

The conditional variable 106 may be defined by a continuous or discrete series of values over time within a time period 202. In the example, the probabilistic variable 108 and the time series 116 are defined by a continuous or discrete series of values over time within the time period 202.

The time period 202 in the example may be dividable in time steps or geographical steps comprising values for determining the time series 116. In the example, one value of the time series 116 is determined per time step. Discretization in the example is per time unit. We could also discretize per calculation step or distance unit.

In this aspect, the device 100 is adapted to provide the conditional variable 106 as a continuous or discrete first series of values over time within a time period 202, to provide the probabilistic variable 108 as a continuous or discrete second series of values over time within the time period 202, determine by the first model 102, in particular a first Recurrent Neural network, a continuous or discrete third series of values for the time series 116 depending on the values of the first series and the second series, and determine by the second model 118, in particular a second Recurrent Neural network, the score 120 depending on the values of the first series and the third series.

Figure 3:
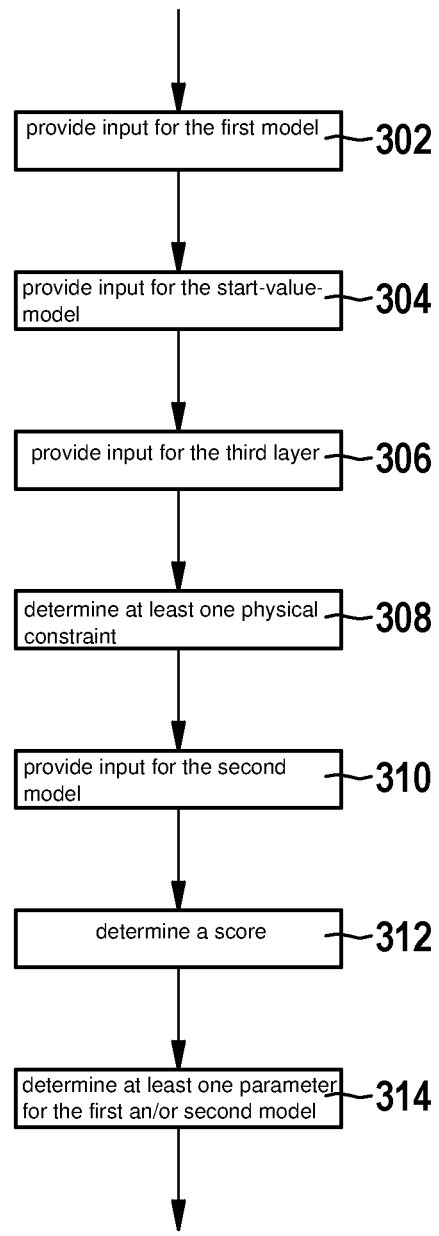
FIG. 3 schematically depicts steps in a method for determining the time series, in accordance with an example embodiment of the present invention.

The method described below with reference to FIG. 3 assumes that a trained first model 102 is implemented. The method comprises steps of an exemplary cycle for determining the time series 116. In case the start-value-model is used, it is assumed that the start-value-model is already trained as well. In one aspect, the second model 118 may be present in particular during training. In another aspect, the start-value-model may be trained during training as well. The start-value-model may be integrated in the first model 102. However, after the training, the first model 102 may be used independently from the second model 118.

The method of operating the machine learning system for determining the time series 116 comprises a step 302 of providing an input for the first model 102 depending on the probabilistic variable 108. The step 302 may comprise providing the input for the first model 102 depending on the conditional variable 106. In the example, the probabilistic variable 108 is noise, e.g. white noise. The step 304 may comprise providing an input for the start-value-model depending on the conditional variable 106 and the time series 116.

In the example, for the conditional variable 106, the continuous first series of values over time of the road slope characteristic 106a and the speed limit characteristic 106b within the time period 202 is provided.

In the example, the probabilistic variable 108 is provided as the continuous second series of values over time within the time period 202.

Afterwards, in a step 304 the time series 116 is determined depending on an output of the first model 102 in response to the input for the first model 102. In the example, the input for the first model 102 that is determined from the probabilistic variable 108 is mapped to the output characterizing the time series 116. When the conditional variable 106 is available, the input for the first model 102 that is determined from the conditional variable 106 and the probabilistic variable 108 may be mapped to the output characterizing the time series 116.

The start value may be determined in step 304 as well. In this aspect, the time series 116 is determined depending on the start value. The start value is determined as output of a start-value-model in the example. In particular, the artificial neural network maps the conditional variable 106 to the start value. Alternatively, the start value may be set to zero.

The first model 102 applies the at least one physical constraint 112 for the time series 116 in the mapping. In the example, a value of the time series 116 is determined depending on a squashing function, i.e. a limiting function depending on a minimum and a maximum as:

$$x'_t = \sigma(x_t; \theta) \times (\overline{x}_t - \underline{x}_t) + \underline{x}_t$$

wherein $\sigma(x_t; \theta)$ is a function squashing $x_t$ to [0,1] parameterized by e for instance $$\sigma(x_t; \theta) = \frac{1}{1 + e^{-\theta x_t}}$$

wherein $\underline{x}_t$ characterizes the minimum, $\overline{x}_t$ characterizes the maximum, $x_t$ characterizes the intermediate data 110 and $x'_t$ characterizes the time series 116. As an alternative, discrete values may be determined depending on a softmax function. This requires masking with respect to the minimum/maximum ranges. Masking in this context refers to masking out values outside of the limits during training. The allowed range is guaranteed during test time even by operations different than what was done during training. $\theta$ characterizes parameters in this formula that might be tuned during training of the Generative Adversarial Network.

A function for a value $\dot{x}'_{t+1}$ may be used as well:

$$\dot{x}'_{t+1} = \left[ \frac{1}{1 + e^{-\dot{x}_{t+1}}} \times (\overline{a}_{t+1} - \underline{a}_{t+1}) \right] + \underline{a}_{t+1}.$$

wherein $\dot{x}'_{t+1}$ characterizes the change of the variable of the time series 116.

The method further comprises a step 306 of providing an input for the third layer 102c. The input for the third layer 102c in the example is the at least one state of the machine 114 and/or the conditional variable 106.

Afterwards in a step 308, at least one physical constraint 112 for the time series 116 is determined depending on the at least one state of the machine 114. In an example, the physical constraint 112 for a time step is determined depending on the time series 116 of a previous time step, a force applied in the environment, e.g. to the machine and/or by the machine.

The method may comprise a step 310 of providing an input for the second model 118 depending on the conditional variable 106 and the time series 116. The values of the first series and the third series may be provided as input to the second model 118.

The method may comprise a step 312 of determining a score 120 indicating a degree of reliance for the time series 116 depending on an output of the second model 118 in response to the input for the second model 118. The output of the second model 118 characterizes the score 120. The second model 118 in this aspect is trained to map the input for the second model 118 determined depending on the conditional variable 106 and the time series 116 to the output characterizing the score 120.

In one aspect, the score 120 is determined by the second model 118, in particular the second Recurrent Neural network, depending on the values of the first series and the third series.

The method may comprise a step 314 of determining at least one parameter of the first model 102 or of the second model 118 or both depending on the score 120. The method may comprise determining at least one parameter of the start-value-model in step 314 as well.

All the variables needed to compute physical quantities are in the example given by a machine specification. All physical formulas that are required to compute the dependencies are given by the machine specification and laws of physics. The third layer 102c may be implemented in various ways and designed to model various of the aforementioned aspects of the machine in more or less detail. It is also possible to estimate machine specific parameters or dependencies from data of other in particular similar devices if the exact specification is unknown.

The so trained models or the machine learning system 200 may execute steps of the method described above for predicting the time series 116.

The time series 116 may be used for simulation of a machine behavior or of machine outputs. The time series 116 may characterize a machine state series and the intermediate data 110 may characterize a machine state change series. The time series 116 may characterize a position over time of the machine in the environment. The intermediate data 110 may characterize a change of speed and/or angle over time of the machine in the environment. The intermediate data 110 in this case may characterize the change of the machine behavior or output and the physical constraint 112 may be determined and applied as described above. The conditional variable 106 in this aspect may be an internal machine state or a state external to the machine. This simulation may be used for a probabilistic judgment of the compliance to machine limits, an optimization of a parametrization of the machine or a control of the machine. The simulation may be used for predictive machine control. In addition, an machine output characteristic for the machine may be estimated.

When the device is a vehicle, the time series 116 may be used for load collective analysis for a dimensioning or a control strategy of a component of the vehicle. The intermediate data 110 in this aspect is an unconstrained variable characterizing an acceleration time series. The physical constraint 112 in this aspect is for example characterized by a minimum and/or maximum acceleration of the vehicle that may depend on vehicle mass, road friction and/or slope.

When the device is a robot, the time series 116 may be a robot trajectory. The trajectory may comprise robot positions over time in the environment. The environment may be a warehouse. In this aspect, for safety analysis of a swarm of robots, e.g. in the warehouse, potential trajectories of different robots are generated. The different robots may carry different loads. The intermediate data 110 in this case may characterize a change of speed and/or angle of the robot over time. The physical constraint 112 in this case may be a maximum allowed value of the change of angles between two time-steps. This can be computed from the physical properties of the robot, e.g. taking into account the current center of the mass of the robot, which depends on the shape of the robot, and the load it is currently carrying. A change in speed and angle is in this aspect limited so as not to tip over the robot.

For traffic simulation, e.g. for mobility studies, the time series 116 may characterize a traffic density over time for a given road segment. The environment in this aspect is characterized by the road segment. The intermediate data 110 in this aspect may be a number of cars over time on the given road segment. The physical constraint 112 may be defined by a relation between road segments. The relations between the road segments may be described by a road network, e.g. in a map. The physical constraint 112 may be defined as a consistent flow of traffic on the connected segments. For example a number of cars on a segment where multiple roads merge will be the sum of the out-flow of each merging road.

The second model 118 may not be present after the training. When the second model 118 is present after the training, the second model 118 may be used for determining or discriminating safe from unsafe values of the machine output characteristic over time. This ensures higher accuracy by the way of physical compliance and this ensures higher accuracy in downstream tasks.

Thus downstream tasks may avoid unstable and/or unsafe regimes since the physically implausible inputs might make the downstream system unstable and/or unsafe.

The third layer 102c may also involve calculating a number of intermediate features. For example in addition to determining the machine output range as the physical constraint 112 as described above, an actual machine output may be determined by the third layer 102c depending on forces applied to or applied by the machine. To improve accuracy of the generative model, these intermediate features may be added to the conditional input of the first layer 102a.

What is claimed is:

1. A computer implemented method of operating a machine learning system for determining a time series, the method comprising the following steps:
   providing an input for a first generative model depending on a probabilistic variable, the probabilistic variable being noise;
   determining an output of the first model in response to the input for the first model, wherein the output of the first model represents the time series, the first model including a first layer that is trained to map the input for the first model determined depending on the probabilistic variable to output characterizing intermediate data, the first model further including a second layer that is trained to map the intermediate data to the time series depending on an output of a third layer of the first model, the output of the third layer characterizing a physical constraint to a machine state, and wherein values of the time series or the intermediate data are constrained by the output of the third layer;
   providing the input for the first model depending on a conditional variable;
   wherein the first layer and/or the second layer are trained to map the input for the first model determined depending on the conditional variable and the probabilistic variable to output characterizing the intermediate data;
   providing the conditional variable as a continuous or discrete first series of values over time within a time period and/or providing the probabilistic variable as a continuous or discrete second series of values over time within the time period;
   determining by the first model, a continuous or discrete third series of values for the time series depending on the values of the first series and the second series; and
   determining by a second model a score depending on the values of the first series and the third series; and
   wherein the first model is a first Recurrent Neural network and the second model is a second Recurrent Neural network.

2. The method according to claim 1, further comprising:
providing an input for the third layer depending on at least one state of a machine and/or the conditional variable; and
determining an output of the third layer in response to the input for the third layer.

3. The method according to claim 2, wherein the physical constraint for a time step is determined depending on the time series in a previous time step, and/or a force applied in the environment, and/or a force applied by or to the machine in an environment.

4. The method according to claim 2, wherein the time series characterizes a position over time of the machine in an environment and the intermediate data characterizes a change of speed and/or angle over time of the machine in the environment.

5. The method according to claim 2, wherein the time series is determined depending on output of the first model and the second model in response to training data defining input data for the first model and the second model, wherein the output of the second model characterizing the score indicating the degree of reliance for the time series is determined, and wherein at least one parameter of the first model and/or the second model is determined depending on the score.

6. The method according to claim 5, further comprising:
providing input data including the time series, the conditional variable, the intermediate data, and at least one state of the machine.

7. The method according to claim 1, wherein the conditional variable includes at least one of: an environment variable or an internal machine state.

8. The method according to claim 1, further comprising:
providing an input for the second model depending on the conditional variable and/or the time series; and
determining an output of the second model in response to the input for the second model;
wherein the output of the second model characterizes the score indicating a degree of reliance for the time series, wherein the second model is trained to map the input for the second model determined depending on the conditional variable and the time series to output of the second model characterizing the score indicating the degree of reliance for the time series.

9. The method according to claim 1, wherein the time series characterizes a machine state series and the intermediate data characterizes a machine state change series.

10. The method according to claim 9, wherein the machine state characterizes a velocity and the intermediate data characterizes an unconstrained acceleration or the machine state characterizes a gear of a transmission and the intermediate data characterizes an unconstrained gear.

11. A machine learning system, comprising:
a first model; and
a second model;
wherein the machine learning system is configured to determine a time series, machine learning system configured to:
provided an input for the first model depending on a probabilistic variable, the probabilistic variable being noise; and
determine an output of the first model in response to the input for the first model, wherein the output of the first model represents the time series, the first model including a first layer that is trained to map the input for the first model determined depending on the probabilistic variable to output characterizing intermediate data, the first model further including a second layer that is trained to map the intermediate data to the time series depending on an output of a third layer of the first model, the output of the third layer characterizing a physical constraint to a machine state, and wherein values of the time series or the intermediate data are constrained by the output of the third layer;
provide the input for the first model depending on a conditional variable;
wherein the first layer and/or the second layer are trained to map the input for the first model determined depending on the conditional variable and the probabilistic variable to output characterizing the intermediate data;
provide the conditional variable as a continuous or discrete first series of values over time within a time period and/or providing the probabilistic variable as a continuous or discrete second series of values over time within the time period;
determine by the first model, a continuous or discrete third series of values for the time series depending on the values of the first series and the second series; and
determine by the second model a score depending on the values of the first series and the third series; and
wherein the first model is a first Recurrent Neural network and the second model is a second Recurrent Neural network.

12. A non-transitory computer readable storage medium on which is stored a computer program for operating a machine learning system for determining a time series, the computer program, when executed by computer, causes the computer to perform the following steps:
providing an input for a first generative model depending on a probabilistic variable, the probabilistic variable being noise; and
determining an output of the first model in response to the input for the first model, wherein the output of the first model represents the time series, the first model including a first layer that is trained to map the input for the first model determined depending on the probabilistic variable to output characterizing intermediate data, the first model further including a second layer that is trained to map the intermediate data to the time series depending on an output of a third layer of the first model, the output of the third layer characterizing a physical constraint to a machine state, and wherein values of the time series or the intermediate data are constrained by the output of the third layer;
providing the input for the first model depending on a conditional variable;
wherein the first layer and/or the second layer are trained to map the input for the first model determined depending on the conditional variable and the probabilistic variable to output characterizing the intermediate data;
providing the conditional variable as a continuous or discrete first series of values over time within a time period and/or providing the probabilistic variable as a continuous or discrete second series of values over time within the time period;
determining by the first model, a continuous or discrete third series of values for the time series depending on the values of the first series and the second series; and
determining by a second model a score depending on the values of the first series and the third series; and
wherein the first model is a first Recurrent Neural network and the second model is a second Recurrent Neural network.

* * * * *